(12) United States Patent
Shiao

(10) Patent No.: US 10,130,144 B1
(45) Date of Patent: Nov. 20, 2018

(54) METHOD FOR MAKING A SHOE IN A THREE DIMENSIONAL MANNER

(71) Applicant: DAH LIH PUH CO., LTD., Taichung (TW)

(72) Inventor: Jui-Fen Shiao, Taichung (TW)

(73) Assignee: Dah Lih Puh Co., Ltd., Taichung (TW)

( * ) Notice: Subject to any disclaimer, the term of this patent is extended or adjusted under 35 U.S.C. 154(b) by 0 days.

(21) Appl. No.: 15/600,008

(22) Filed: May 19, 2017

(51) Int. Cl.
| | | |
|---|---|---|
| *A43D 999/00* | (2006.01) | |
| *A43D 8/24* | (2006.01) | |
| *A43D 3/02* | (2006.01) | |
| *A43B 13/04* | (2006.01) | |
| *A43B 23/02* | (2006.01) | |
| *A43B 3/00* | (2006.01) | |
| *B29D 35/12* | (2010.01) | |
| *B29K 75/00* | (2006.01) | |

(52) U.S. Cl.
CPC .............. *A43D 8/24* (2013.01); *A43B 3/0078* (2013.01); *A43B 13/04* (2013.01); *A43B 23/026* (2013.01); *A43D 3/02* (2013.01); *A43D 999/00* (2013.01); *B29D 35/122* (2013.01); *B29D 35/128* (2013.01); *B29K 2075/00* (2013.01)

(58) Field of Classification Search
CPC ........ A43B 13/04; A43B 23/026; A43D 8/24; A43D 999/00; B29D 35/122
USPC ..... 12/142 R, 146 B, 146 BR, 146 C, 142 A, 12/142 B, 142 RS, 142 T
See application file for complete search history.

(56) References Cited

U.S. PATENT DOCUMENTS

| | | | | |
|---|---|---|---|---|
| 3,812,604 | A * | 5/1974 | Sato | A43B 9/18 12/142 RS |
| 4,562,606 | A * | 1/1986 | Folschweiler | A43B 1/0027 12/142 RS |
| 4,930,175 | A * | 6/1990 | Chen | A43B 7/12 12/142 E |
| 5,351,352 | A * | 10/1994 | Chillemi | A43D 21/00 12/145 |
| 5,515,566 | A * | 5/1996 | Ganon | A43B 3/14 12/142 A |
| 5,586,354 | A * | 12/1996 | Chi | A43B 13/00 12/142 RS |
| 7,877,905 | B2 * | 2/2011 | Bensing | A43B 1/0063 12/146 C |
| 8,640,291 | B2 * | 2/2014 | Fleming | A43B 9/12 12/142 RS |
| 2010/0031535 | A1 * | 2/2010 | Leedy | A43B 1/0027 36/103 |
| 2011/0047720 | A1 * | 3/2011 | Maranan | A43B 13/125 12/146 B |

(Continued)

*Primary Examiner* — Marie Bays
(74) *Attorney, Agent, or Firm* — Wang Law Firm, Inc.

(57) ABSTRACT

A method for making a shoe in a three dimensional manner includes: a step of sewing and weaving, a step of prototyping, a step of inserting an insole, a step of seaming, a step of inserting a shoe tree, a step of pressing which includes: preparing a sole mold filled with a semi-cured sole, and a decorative-member mold filled with a semi-cured decorative member, pushing the decorative-member mold against the vamp with the semi-cured decorative members and the semi-cured sole pressed against the bottom surface; and a step of heating which includes: heating the cloth sleeve to melt the semi-cured sole and decorative members; the decorative members and the sole will be fully cured.

5 Claims, 12 Drawing Sheets

(56) References Cited

U.S. PATENT DOCUMENTS

2015/0342286 A1* 12/2015 Huffman .................. A43B 1/04
36/9 R
2015/0342296 A1* 12/2015 Skaja ....................... A43B 9/12
36/83

* cited by examiner

METHOD FOR MAKING A SHOE IN A THREE DIMENSIONAL MANNER

BACKGROUND

Field of the Invention

The present invention relates to a vamp of a shoe, and more particularly to a method for making a shoe in a three dimensional manner.

Related Prior Art

Shoes are indispensable to out daily life. Among them, there is a kind of shoe whose vamp and liner are both made of cloth, which makes the wearer's feet feel more comfortable as compared to other shoes.

Please refer to FIG. 1, the shoe made of cloth mentioned above is made by a method comprising the following steps: 1) sewing a cloth made of TPU (thermoplastic polyurethane) into a cloth sleeve 10 which has an open end and a closed end; 2) diving the cloth sleeve 10 along a dividing line close to the center of the cloth sleeve 10 into a lining and an outer layer, folding up the lining and tucking it into the outer layer to make the closed end face towards the open end; 3) putting the folded cloth sleeve 10 onto a flat surface, pressing, by a mould A, a decorative member 13 onto the outer layer; 4) inserting a shoe last into the vamp to shape the non-formed cloth sleeve 10 into a desired form; 5) heating the cloth sleeve 10 which has been inserted with the shoe last, when temperature reaches 60-120° C., TPU (thermoplastic polyurethane) material inside the cloth sleeve 10 is cured, and then the cloth sleeve 10 is solidified into a finished vamp in the shape of the shoe last after the TPU material cools off; 4) connecting a sole to the finished vamp to form a shoe.

It is to be noted that, in the step 3 as shown in FIG. 1, the cloth sleeve 10 has a very limited area for pressing since it is formed on a flat surface, and a three dimensional cloth sleeve 10 includes the upper surface 11 and the lateral surface 12. FIG. 1 shows that the mould A is pressing against the upper surface 11, wherein the lateral surface 12 is deformed while being pressed. Therefore, it is impossible to press a decorative member 13 on the lateral surface 12 while pressing the upper surface 11 with the mould A, and it has to wait until the pressing of the decorative member 13 onto the upper surface 11 is completed, and the lateral surface 12 is flattened, to pressing the decorative member 13 on the lateral surface 12.

With this method, the decorative members 13 cannot be pressed at one sitting, which complicates the procedures for pressing the decorative members 13. Besides, pressing the decorative member 13 which has been formed and cooled off directly onto the cloth sleeve 10 makes it difficult for the decorative member 13 to fit well against the cloth sleeve 10, and as a result, the decorative member 13 is more likely to falling off.

The present invention has arisen to mitigate and/or obviate the afore-described disadvantages.

SUMMARY

One objective of the present invention is to provide a method for fixing a decorative member on a vamp of a shoe in a three dimensional manner, wherein the step of pressing decorative members allows the decorative members to be simultaneously pressed onto the upper surface and the lateral surface of the vamp, which substantially reducing shoe manufacturing time.

To achieve the above objective, a method for making a shoe in a three dimensional manner in accordance with the present invention comprises:

a step of sewing including: sewing a net cloth into a cloth sleeve, wherein the cloth sleeve has an open end, a closed end, and an annular connecting portion between the open end and the closed end, defining a portion between the annular connecting portion and the closed end as an inner layer, and defining a portion between the annular connecting portion and the open end as an outer layer;

a step of prototyping including: folding and tucking the inner layer from the annular connecting portion into the outer layer to make the inner and outer layers overlapped, so that the annular connecting portion forms a shoe opening, and the inner layer defines an inner space;

a step of inserting an insole including: inserting the insole between the inner layer and the outer layer;

a step of seaming including: seaming the open end to seal the insole between the inner and outer layers;

a step of inserting a shoe tree including: inserting the shoe tree into the inner space to prop open the inner and outer layers in the shape of the shoe tree;

a step of pressing including: preparing a sole mould and a decorative-member mould, wherein the sole mould includes a sole mould cavity and a first abutting surface, the first abutting surface is abutted against the cloth sleeve, the decorative-member mould includes a decorative-member mould cavity and a second abutting surface, the second abutting surface is abutted against the cloth sleeve, filling the sole mould cavity with a semi-cured sole, filling the decorative-member mould cavity with a semi-cured decorative member, pushing the decorative-member mould and the sole mould against the outer layer to attach the semi-cured decorative member and the semi-cured sole to the bottom surface to the outer layer; and a step of heating including: heating the cloth sleeve to melt the semi-cured sole and decorative member, the decorative member and the sole inside the sole mould are melt and cured when heated, when the cloth sleeve cools off, the inner and outer layers are solidified into the shape of the shoe tree.

Preferably, the net cloth is made of a material selected from a group consisting of hot melt yarn, hot melt filament, thermoplastic polyurethane and polyurethane particles.

Preferably, the semi-cured sole and the decorative member are made of a material selected from a group consisting of rigid polyurethane, casting polyurethane and polyurethane.

Preferably, the semi-cured decorative member and the semi-cured sole are heated to 30-80° C.

Preferably, the sole mould and the decorative-member mould are made of a material selected from a group consisting of polyurethane, thermoplastic polyurethane and silicon.

With the method for making a shoe in a three dimensional manner in accordance with the present invention, the decorative members and the sole can be formed on the upper surface, the lateral surface and the bottom surface of the vamp simultaneously in the same step, or the decorative members and the sole can also be separately formed, which simplifies the steps for forming the decorative members and the sole, consequently substantially reducing the necessary time for manufacturing shoes. Since the vamp is made of cloth, the inner layer makes the user feel more comfortable when wearing the shoes. Besides, during the step of heating, the decorative members and the sole are melted, and therefore can be more assuredly bonded to the upper surface, the lateral surface and the bottom surface, which reduces the possibility of the decorative members and the sole falling off of the vamp.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
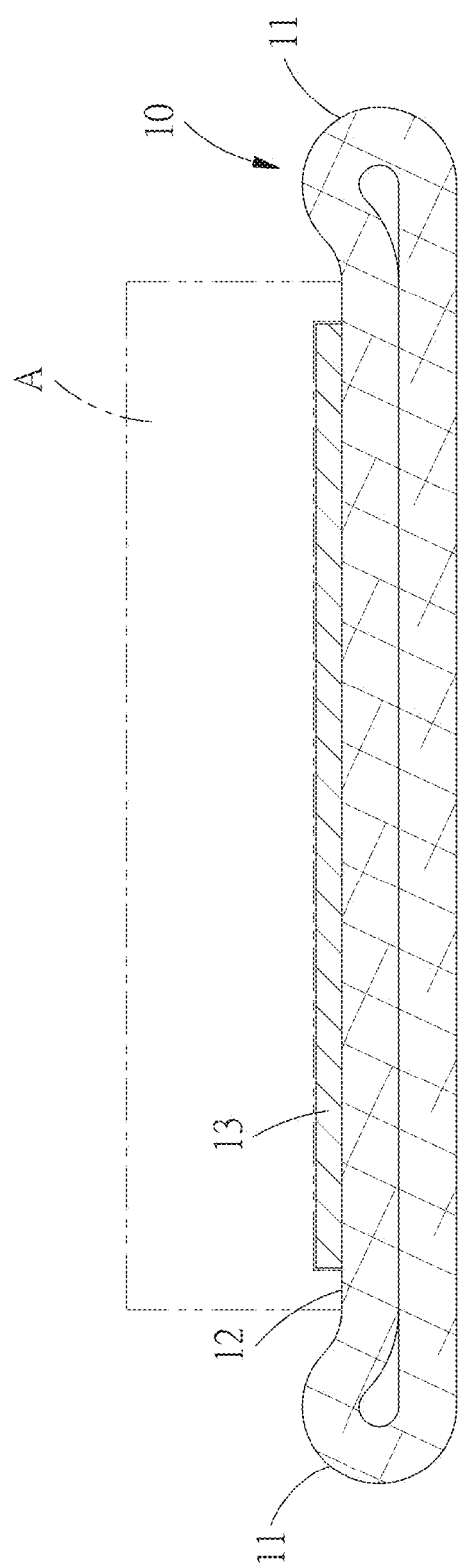
FIG. 1 is a cross sectional view illustrating the conventional method for making a vamp.

The present invention will be clearer from the following description when viewed together with the accompanying drawings, which show, for purpose of illustrations only, the preferred embodiment in accordance with the present invention.

Referring to FIGS. 2-9, a method for making a shoe in a three dimensional manner in accordance with the preferred embodiment of the present invention comprises: a vamp 20, a sole 30 and the decorative member 40.

The vamp 20 includes an upper surface 21, a lateral surface 22 connected to the upper surface 21, and a bottom surface 23. The upper surface 21, the lateral surface 22 and the bottom surface 23 define a 3 dimensional shape of a shoe.

The sole 30 is heated by a sole mould 31 and then connected to the bottom surface 23 of the vamp 20. The sole mould 31 includes a sole mould cavity 311 for accommodation of the sole 30, and a first abutting surface 312 for abutting against the bottom surface 23.

The decorative member 40 is heated and connected to the upper surface 21 or/and the lateral surface 22 of the vamp 20 by a decorative-member mould 41. The decorative-member mould 41 includes a decorative-member mould cavity 411 for accommodation of the decorative member 40, and a second abutting surface 412 for abutting against the upper surface 21 and the lateral surface 22 of the vamp 20.

Figure 2:
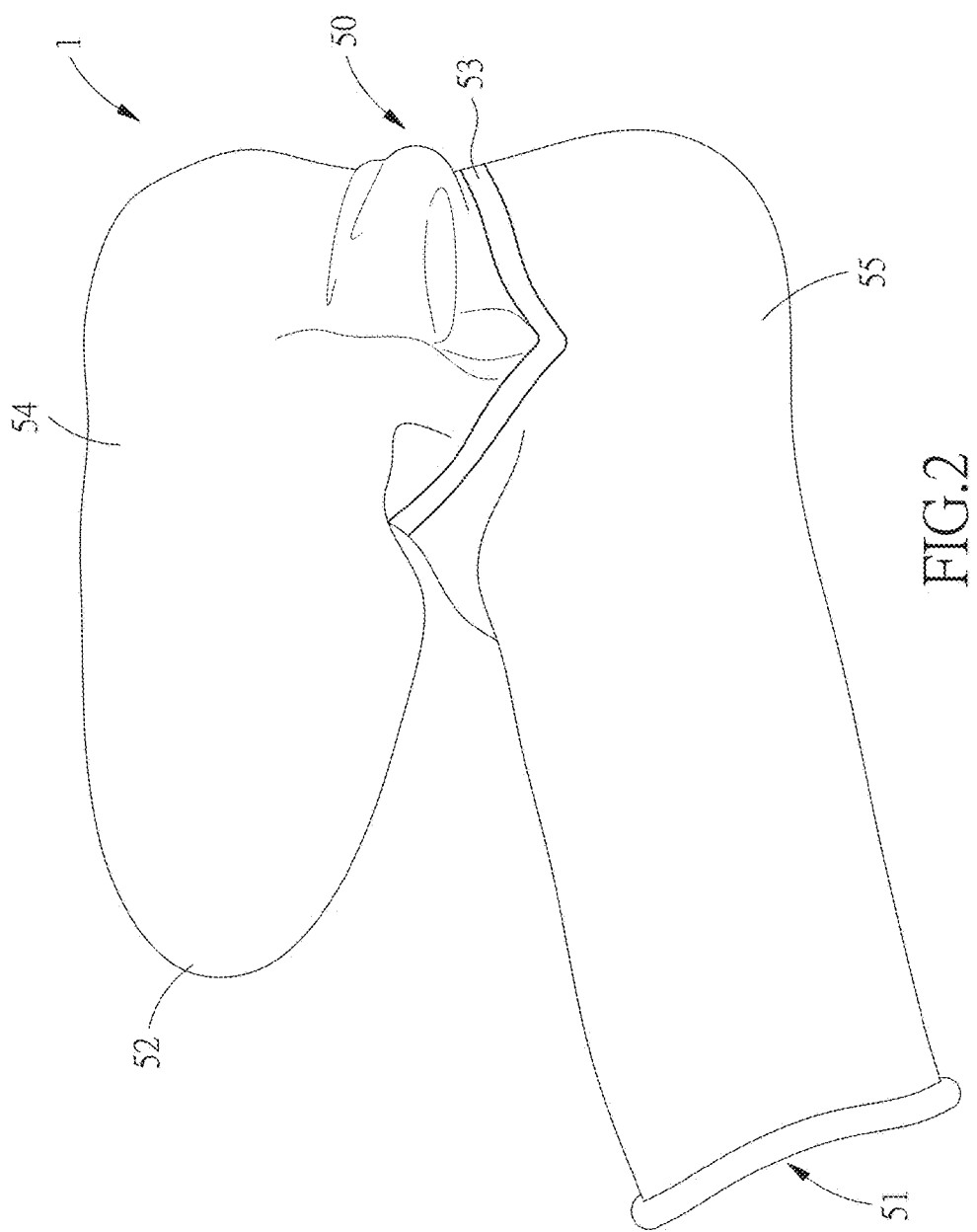
FIG. 2 is an illustrative view showing the step of sewing of the method for making a shoe in a three dimensional manner in accordance with a preferred embodiment of the present invention.
Figure 3:
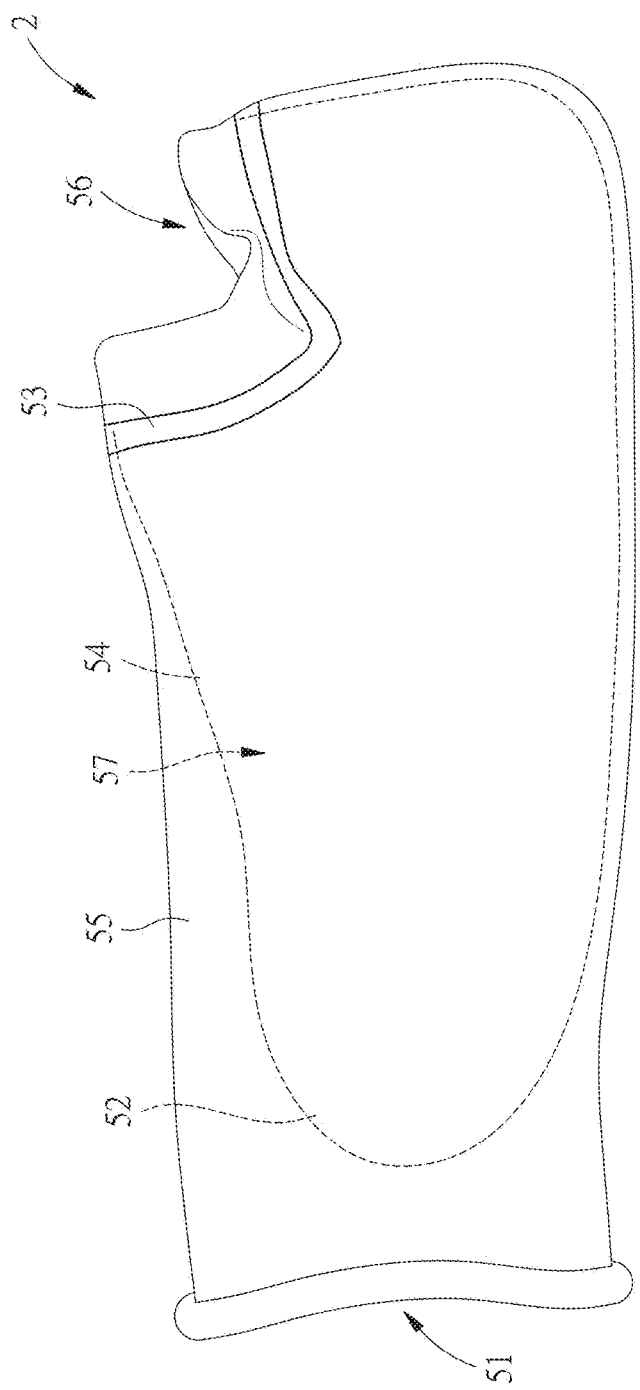
FIG. 3 is an illustrative view showing the step of prototyping of the method for making a shoe in a three dimensional manner in accordance with a preferred embodiment of the present invention.
Figure 4:
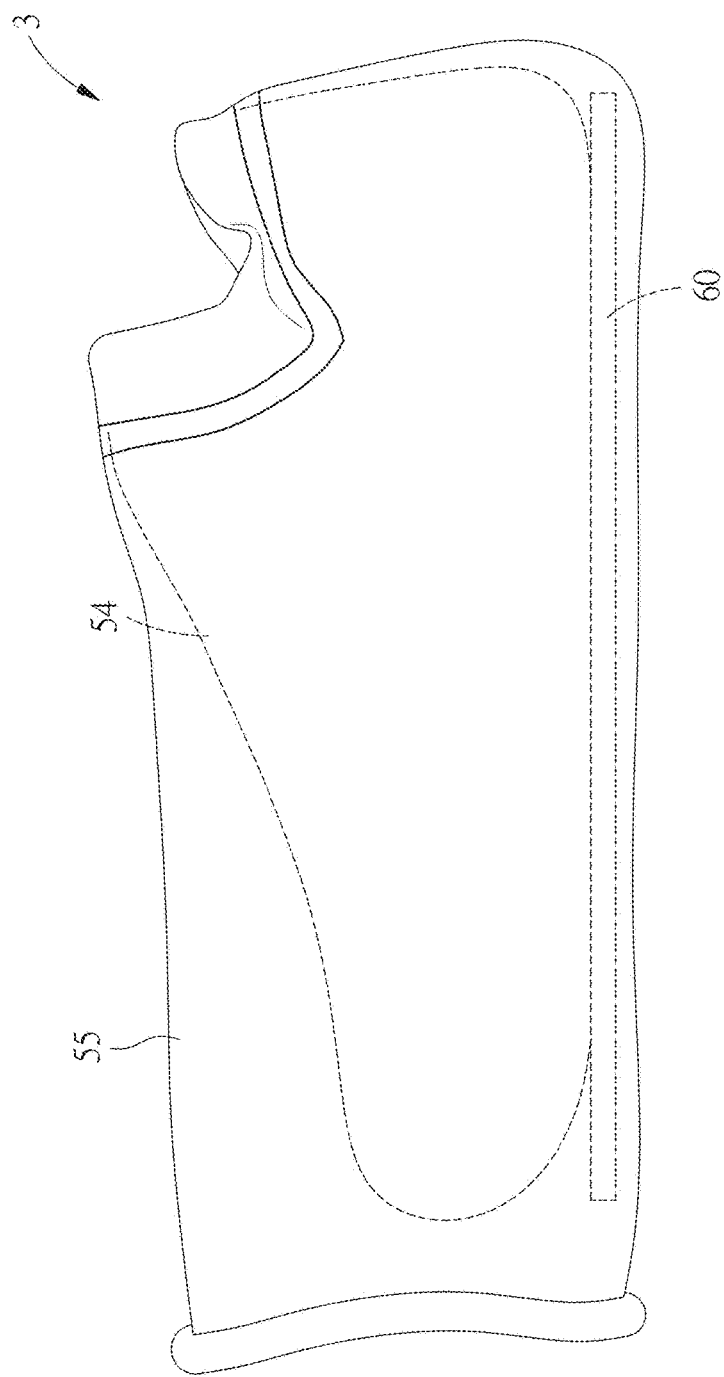
FIG. 4 is an illustrative view showing the step of inserting an insole of the method for making a shoe in a three dimensional manner in accordance with a preferred embodiment of the present invention.
Figure 5:
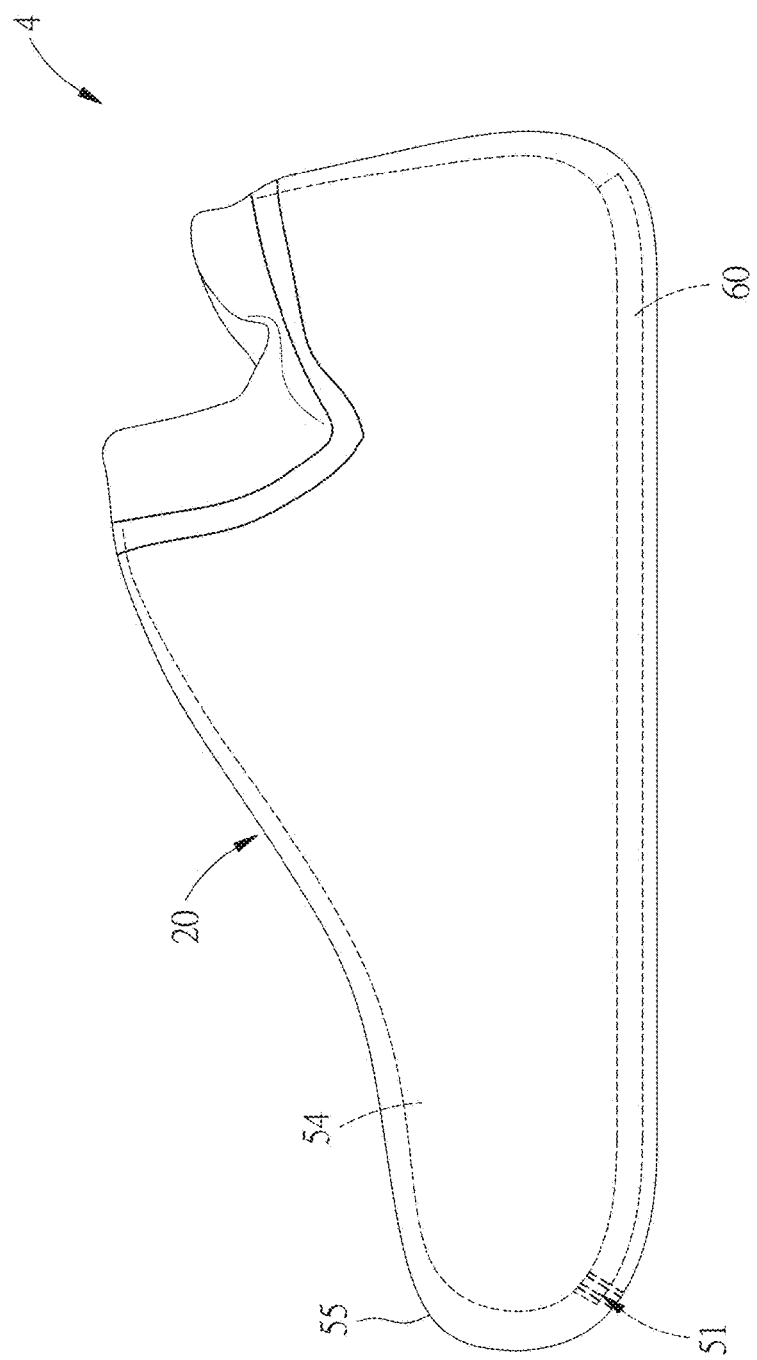
FIG. 5 is an illustrative view showing the step of seaming of the method for making a shoe in a three dimensional manner in accordance with a preferred embodiment of the present invention.
Figure 6:
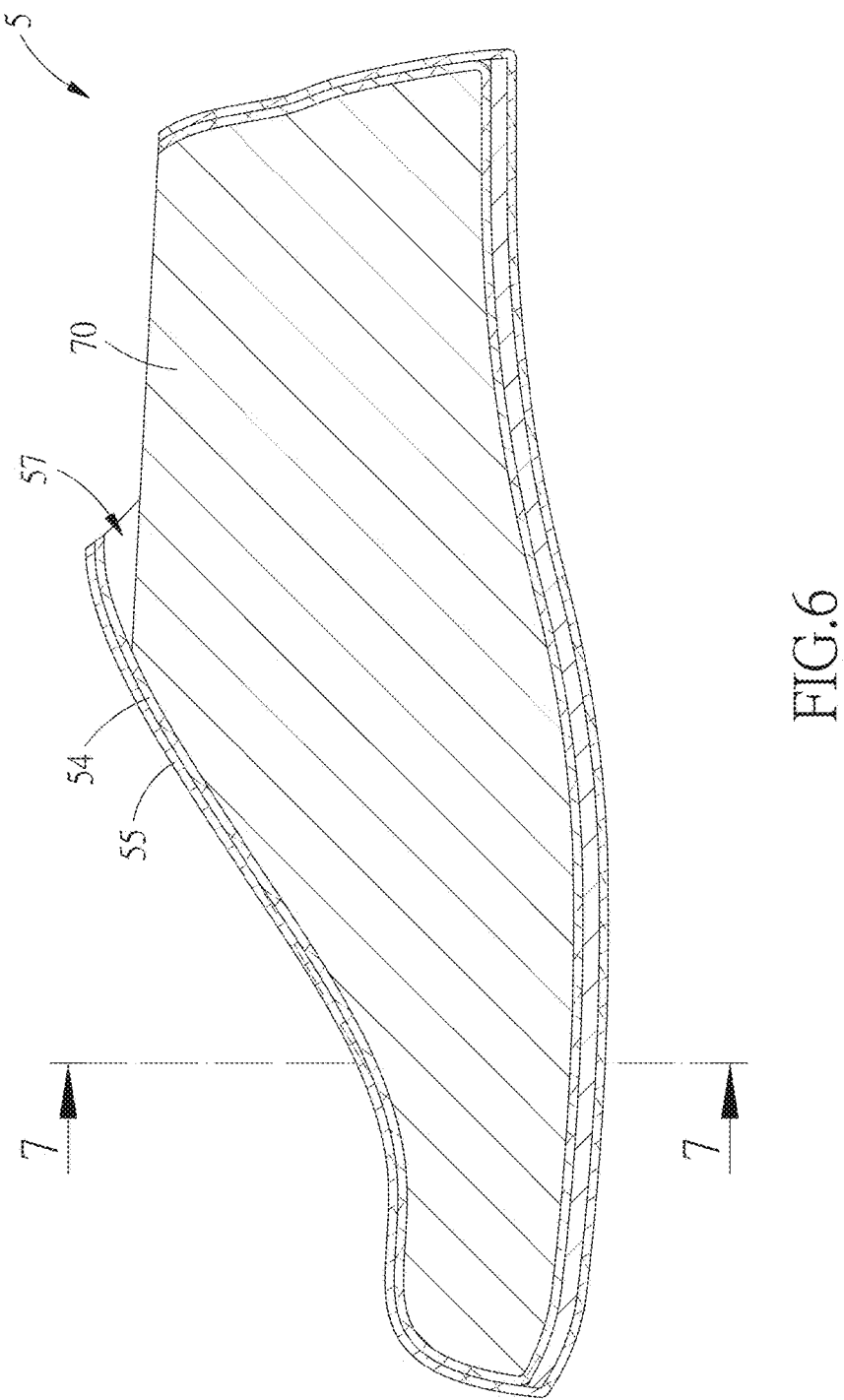
FIG. 6 is an illustrative view showing the step of inserting a shoe tree of the method for making a shoe in a three dimensional manner in accordance with a preferred embodiment of the present invention.
Figure 7:
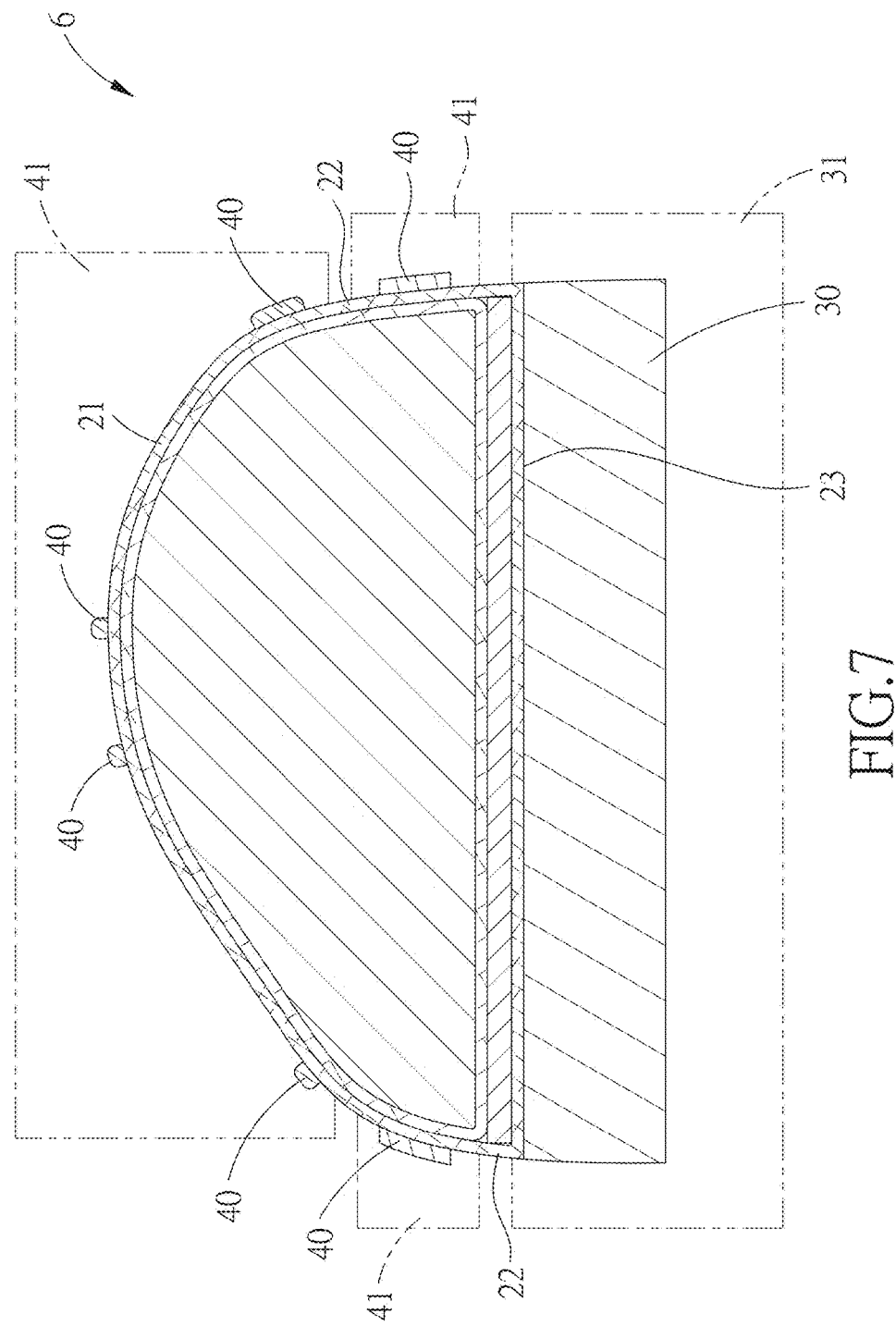
FIG. 7 is a cross sectional view showing the step of pressing of the method for making a shoe in a three dimensional manner in accordance with a preferred embodiment of the present invention.
Figure 8:
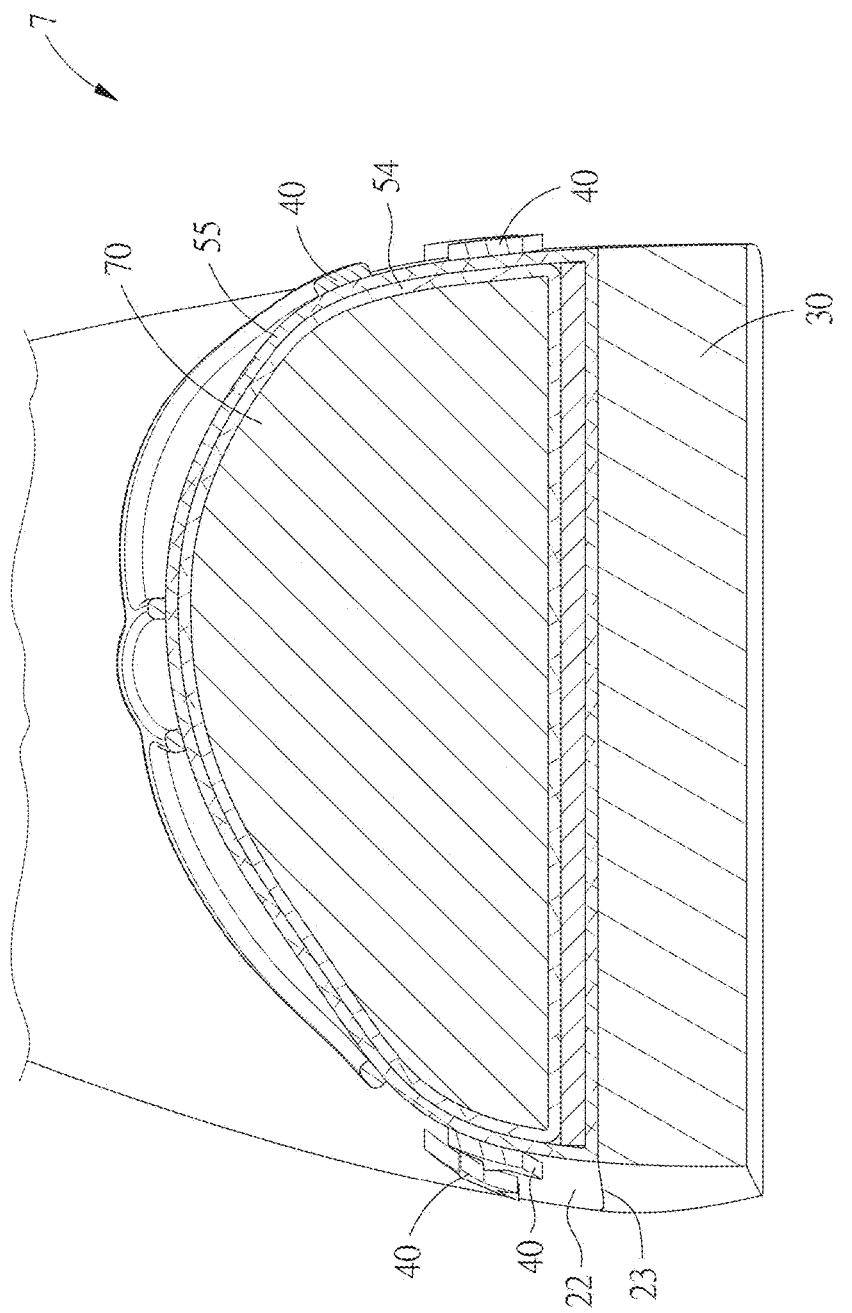
FIG. 8 is an illustrative view showing the step of heating of the method for making a shoe in a three dimensional manner in accordance with the preferred embodiment of the present invention.

Referring to FIGS. 2-9 again, the method for making a shoe in a three dimensional manner in accordance with the preferred embodiment of the present invention comprises the following steps:

a step 1 of sewing, as shown in FIG. 2: sewing a net cloth contains hot melt yarn, hot melt filament, TPU (thermoplastic polyurethane) or PU (polyurethane) particles into a cloth sleeve 50, the cloth sleeve 50 has an open end 51, a closed end 52, and an annular connecting portion 53 between the open end 51 and the closed end 52, defining a portion between the annular connecting portion 53 and the closed end 52 as an inner layer 54, and defining a portion between the annular connecting portion 53 and the open end 51 as an outer layer 55;

a step 2 of prototyping, as shown in FIG. 3: folding and tucking the inner layer 54 from the annular connecting portion 53 into the outer layer 55 to make the inner and outer layers 54, 55 overlapped, so that the closed end 52 of the inner layer 54 is located close to the open end 51, the annular connecting portion 53 forms a shoe opening 56, and the inner layer 54 defines an inner space 57;

a step 3 of inserting an insole 60, as shown in FIG. 4: inserting the insole 60 between the inner layer 54 and the outer layer 55;

a step 4 of seaming, as shown in FIG. 5: seaming the open end 51, so that the insole 60 is sealed between the inner and outer layers 54, 55;

a step 5 of inserting a shoe tree 70, as shown in FIG. 6, inserting the shoe tree 70 into the inner space 57 to prop open the inner and outer layers 54, 55 in the shape of the shoe tree 70;

a step 6 of pressing, as shown in FIG. 7: preparing the sole mould 31 and a plurality of decorative-member moulds 41, there are three decorative-member moulds 41 in this embodiment, the sole mould cavity 311 is filled with a semi-cured sole 30, each of the decorative-member mould cavities 411 is filled with a semi-cured decorative member 40, the semi-cured sole 30 and the semi-cured decorative members 40 are melted when heated to a temperature 30 to 80° C., the semi-cured sole 30 and the decorative members 40 are made of RPU (rigid polyurethane), CPU (casting polyurethane) or PU (polyurethane); pushing the three decorative-member moulds 41 against the upper surface 21 and the lateral surface 22 of the vamp 20, respectively, with the second abutting surface 412 of each of the decorative-member moulds 41 tightly pressing against the cloth sleeve 50 to make the semi-cured decorative members 40 attached to the upper surface 21 and the lateral surface 22; pushing the sole mould 31 against the bottom surface 23 with the first abutting surface 312 tightly pressing against the cloth sleeve 50 to make the semi-cured sole 30 attached to the bottom surface 23. In this embodiment, the sole mould 31 and the three decorative-member moulds 41 can be soft or rigid moulds and are made of PU, TPU or silicon;

a step 7 of heating, as shown in FIG. 8: heating the cloth sleeve 50 to increase the temperature of the hot melt yarn, hot melt filament, TPU or PU particles of the cloth sleeve 50; the decorative members 40 inside the decorative-member moulds 41 and the sole 30 inside the sole mould 31 will be fully cured when heated to 60-120° C., when the cloth sleeve cools off, the hot melt yarn, hot melt filament, TPU or PU particles of the cloth sleeve will be hardened and become the vamp 20, and the inner and outer layers 54, 55 are solidified into the shape of the shoe tree 70, so that the decorative members 40 on the upper surface 21 and the lateral surface 22 become patterns or LOGO, and the sole 30 attached to the bottom surface 23 becomes outsole or heel.

Figure 9:
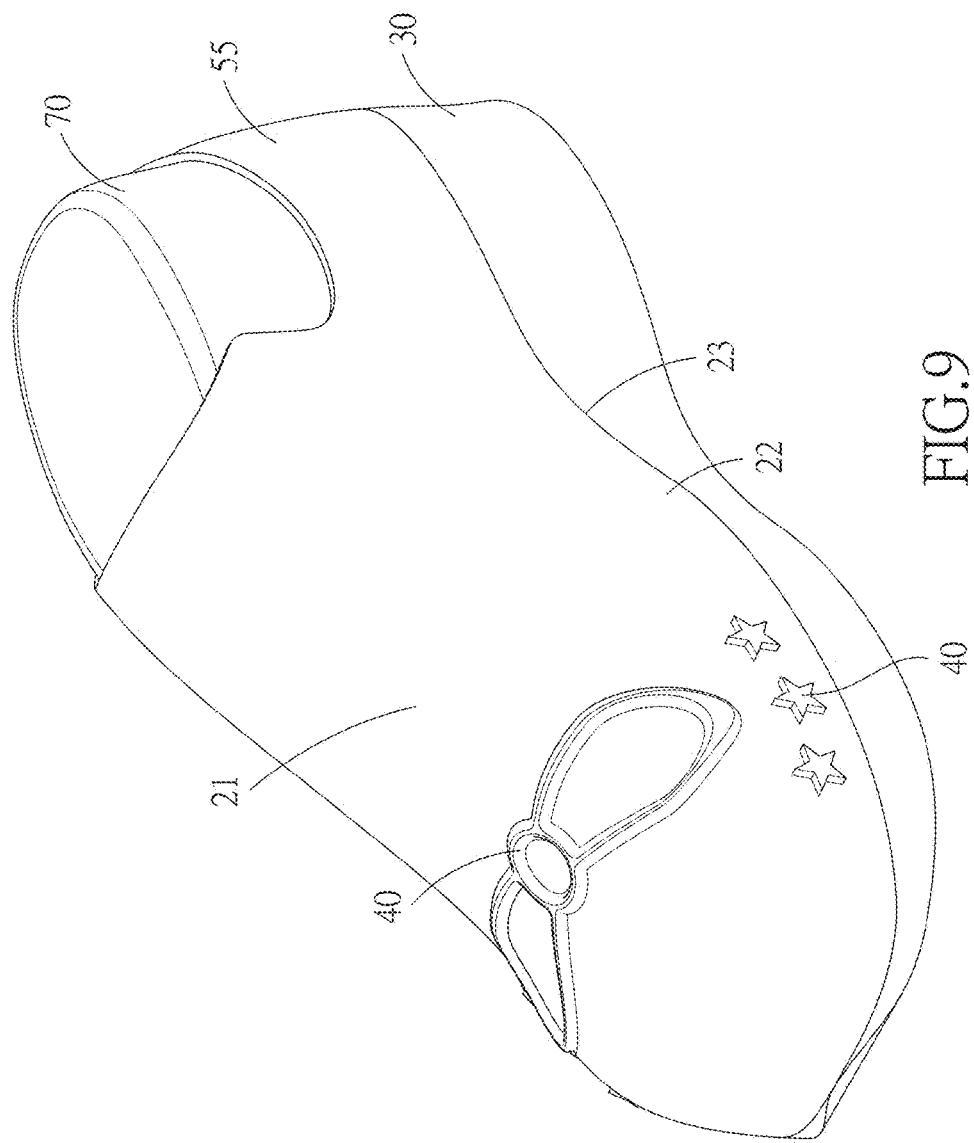
FIG. 9 is a cross sectional view of the method for making a shoe in a three dimensional manner in accordance with the preferred embodiment of the present invention.

As shown in FIG. 9, when the shoe cools off, the hot melt yarn, hot melt filament, TPU or PU particles of the inner and outer layers 54, 55 have been cooled off and solidified. Therefore, the outer layer 5 and the inner layer 54 won't collapse and will still be maintained in the shape of the shoe tree 70 after the shoe tree 70 is removed.

The decorative members 40 and the sole 30 are formed in the same step. In the step 6 of pressing, a plurality of decorative members 40 can be simultaneously formed on the upper surface 21 and the lateral surface 22, and the sole 30 can also be formed on the bottom surface 23 simultaneously with the decorative members 40. Not only the decorative members 40 can be formed in the same step, but also the sole 30 can be formed in the same step along with the decorative members 40. Or, the sole 30 can also be formed in a separate step from the decorative members 40, so that the step for pressing the decorative members 40 and the step for connecting the sole 30 are simplified.

It is to be noted that the decorative members 40 and the sole 30 are semi-cured prior to the step of pressing, the decorative members 40 are pressed onto the upper surface 21 and the lateral surface 22, and the sole 30 is pressed onto the bottom surface 23. During the step of heating, when heated to 30 to 80° C., the decorative members 40 and the sole 30 will be fully melted and will partially permeate into the vamp 20. When it cools off, the decorative members 40 permeated into the vamp 20 and the sole 30 will cool off and become hardened. As compared with the conventional method where the decorative members which have been fully hardened are directly pressed onto the vamp, the decorative members 40 and the sole 30 of the present invention can be more firmly attached to the vamp 20.

Figure 10:
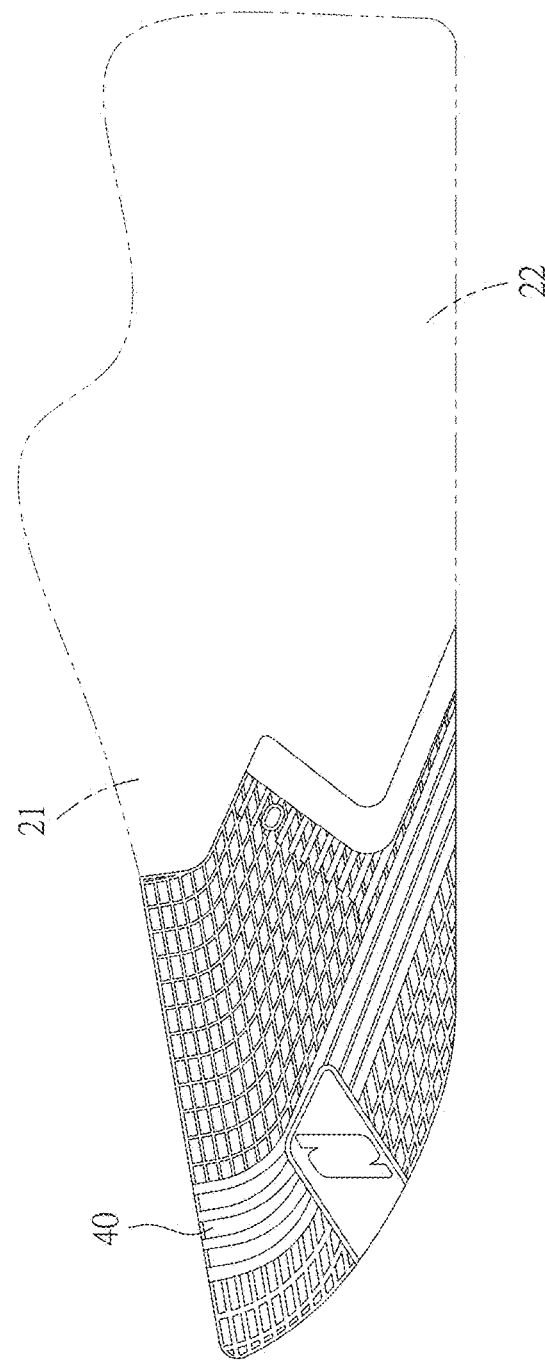
FIG. 10 is an illustrative view showing the decorative members in accordance with the preferred embodiment of the present invention.
Figure 11:
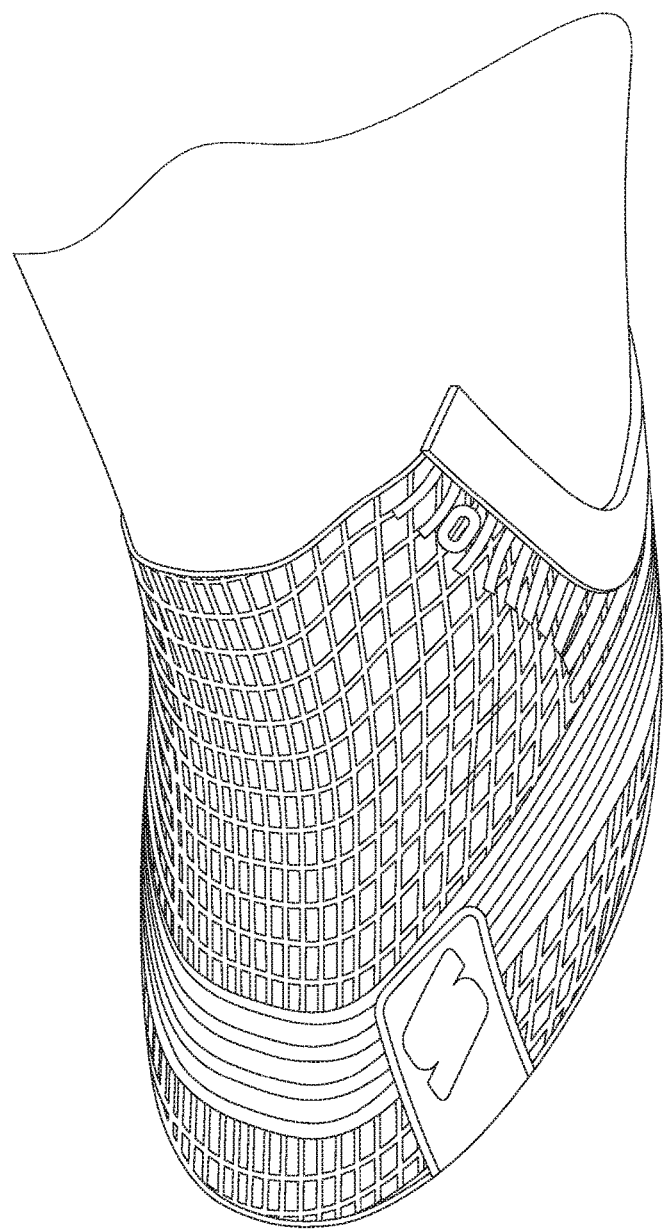
FIG. 11 is a photograph showing the decorative members in accordance with the preferred embodiment of the present invention.
Figure 12:
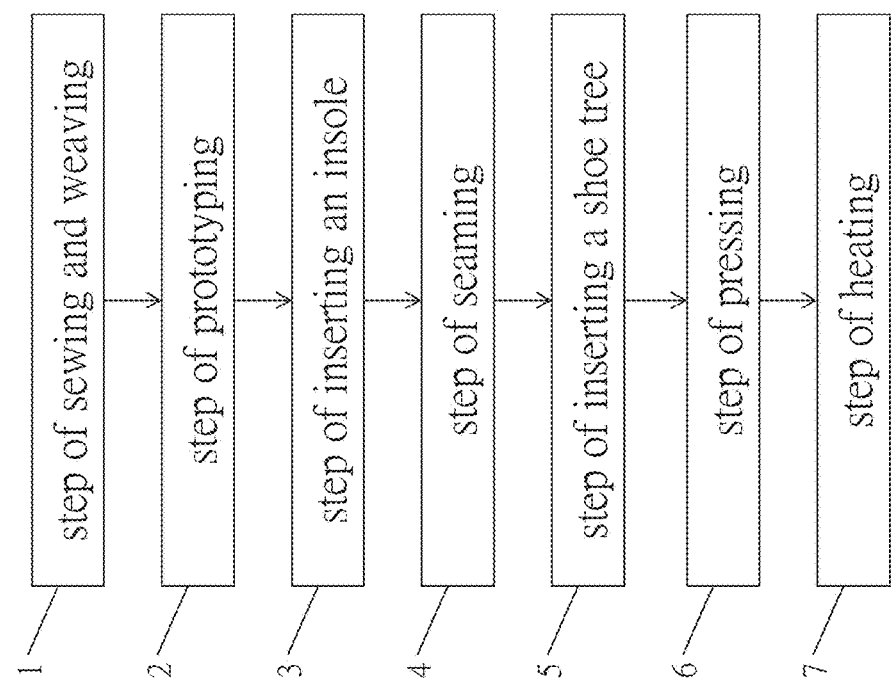
FIG. 12 is a flow chart view showing the showing the method for making a shoe in a three dimensional manner in accordance with the preferred embodiment of the present invention.

Referring to FIGS. 10 and 11, the decorative members 40 can also be integrally formed with the vamp 20 by starting from the upper surface 21 to the lateral surface 22, which makes the decorative members 40 more variable in shapes and styles than conventional decorative members.

With the method for making a shoe in a three dimensional manner in accordance with the present invention, the decorative members 40 and the sole 30 can be formed on the upper surface 21, the lateral surface 22 and the bottom surface 23 of the vamp 20 simultaneously in the same step, or the decorative members 40 and the sole 30 can also be separately formed, which simplifies the steps for forming the decorative members 40 and the sole 30, consequently substantially reducing the necessary time for manufacturing shoes. Since the vamp 20 is made of cloth, the inner layer 54 makes the user feel more comfortable when wearing the shoes. Besides, during the step of heating, the decorative members 40 and the sole 30 are melted, and therefore can be more assuredly bonded to the upper surface 21, the lateral surface 22 and the bottom surface 23, which reduces the possibility of the decorative members 40 and the sole 30 falling off of the vamp.

While we have shown and described various embodiments in accordance with the present invention, it is clear to those skilled in the art that further embodiments may be made without departing from the scope of the present invention.

What is claimed is:

1. A method for making a shoe in a three dimensional manner, comprising:
    a step of sewing including: sewing a net cloth into a cloth sleeve, wherein the cloth sleeve has an open end, a closed end, and an annular connecting portion between the open end and the closed end, defining a portion between the annular connecting portion and the closed end as an inner layer, and defining a portion between the annular connecting portion and the open end as an outer layer;
    a step of prototyping including: folding and tucking the inner layer from the annular connecting portion into the outer layer to make the inner and outer layers overlapped, so that the annular connecting portion forms a shoe opening, and the inner layer defines an inner space;
    a step of inserting an insole including: inserting the insole between the inner layer and the outer layer;
    a step of seaming including: seaming the open end to seal the insole between the inner and outer layers;
    a step of inserting a shoe tree including: inserting the shoe tree into the inner space to prop open the inner and outer layers in the shape of the shoe tree;
    a step of pressing including: preparing a sole mould and a decorative-member mould, wherein the sole mould includes a sole mould cavity and a first abutting surface, the first abutting surface is abutted against the cloth sleeve, the decorative-member mould includes a decorative-member mould cavity and a second abutting surface, the second abutting surface is abutted against the cloth sleeve, filling the sole mould cavity with a semi-cured sole, filling the decorative-member mould cavity with a semi-cured decorative member, pushing the decorative-member mould and the sole mould against the outer layer to attach the semi-cured decorative member and the semi-cured sole to the bottom surface to the outer layer; and
    a step of heating including: heating the cloth sleeve to melt the semi-cured sole and decorative member, the decorative member and the sole inside the sole mould are melt and cured when heated, when the cloth sleeve cools off, the inner and outer layers are solidified into the shape of the shoe tree.

2. The method as claimed in claim 1, wherein the net cloth is made of a material selected from a group consisting of hot melt yarn, hot melt filament, thermoplastic polyurethane and polyurethane particles.

3. The method as claimed in claim 1, wherein the semi-cured sole and the decorative member are made of a material selected from a group consisting of rigid polyurethane, casting polyurethane and polyurethane.

4. The method as claimed in claim 1, wherein the semi-cured decorative member and the semi-cured sole are melted when heated to 30-80° C.

5. The method as claimed in claim 1, wherein the sole mould and the decorative-member mould are made of a material selected from a group consisting of polyurethane, thermoplastic polyurethane and silicon.

* * * * *